E. R. KERR.

Coal Dumping Apparatus.

No. 2,489.

Reissued Feb. 19, 1867.

Witnesses:
M. Blorington
Wm. Irwin

Inventor:
E. R. Kerr
Per Munn & Co

N. PETERS, Photo-Lithographer, Washington, D. C.

United States Patent Office.

EDWIN R. KERR AND JAMES L. PLATT, OF KEWANEE, ILLINOIS, ASSIGNEES OF EDWIN R. KERR.

*Letters Patent No.* 58,549, *dated October* 2, 1866; *reissue No.* 2,489, *dated February* 19, 1867.

IMPROVED COAL-DUMPING APPARATUS.

The Schedule referred to in these Letters Patent and making part of the same.

TO ALL WHOM IT MAY CONCERN:

Be it known that I, EDWIN R. KERR, of Kewanee, in the county of Henry, and State of Illinois, have invented a new and improved Apparatus or Means for Coaling Engines and handling or manipulating coals and ores; and I do hereby declare that the following is a full, clear, and exact description thereof, which will enable those skilled in the art to make and use the same, reference being had to the accompanying drawings, forming part of this specification, in which—

Figure 1:
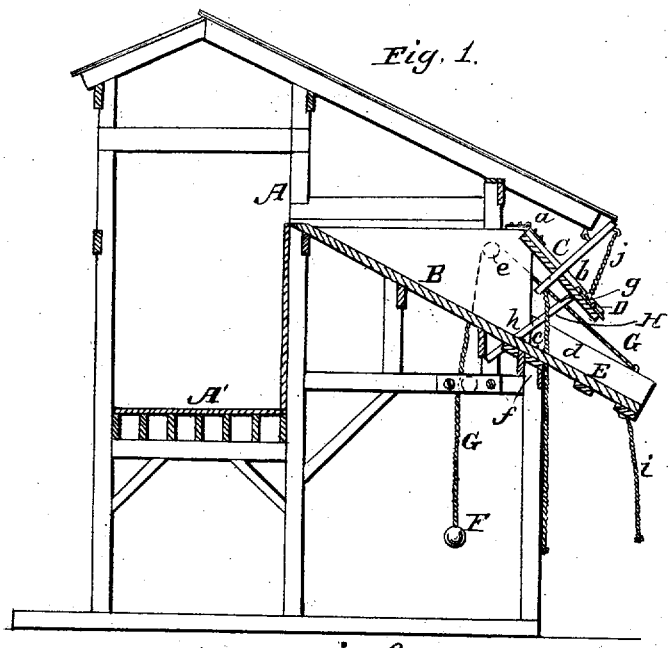
Figure 2:
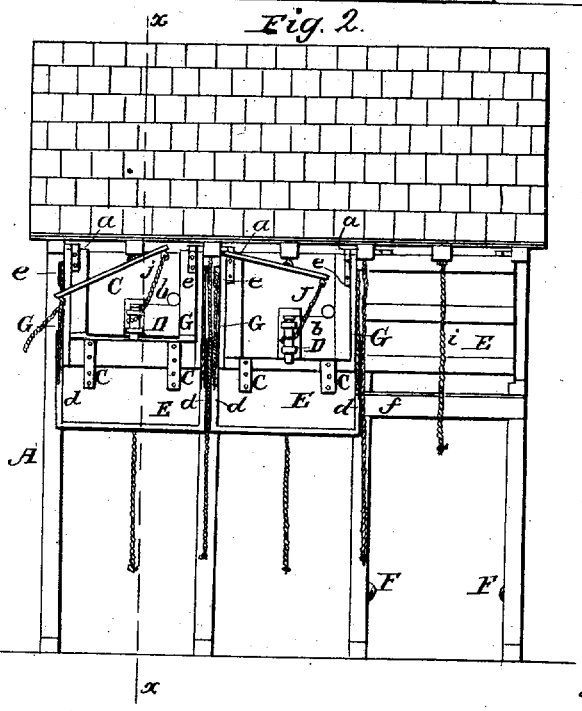

Figure 1 is a vertical section of my invention taken in the line *x x* of fig. 2.

Figure 2, an elevation of the same.

Similar letters of reference indicate corresponding parts.

This invention relates to a new and improved means for supplying locomotive engines with coal, loading cars, transferring, &c., and it consists in having one or more chutes in a shed or building, the chute or chutes being provided with doors, arranged in such a manner that the outer doors when lowered will form a continuation of the chutes, and the inner doors so arranged as to admit of being readily opened to allow the coal to be discharged, and when a heavy weight of coal or other substance rests against them, in a measure retard its rapid descent or transit, (which is not only injurious to the chute, but to the receptacle of the coal,) by causing it to slide partially from the bottom and checking the upper portions. The outer doors are counterpoised, so as to work, open and close, easily without any slamming, and consequently without the liability of being broken or torn from their hinges.

A represents a shed or building, provided with an elevated platform, A′, upon which the coal is conveyed in any suitable vehicle. B represents a series of chutes at one or both sides of the shed or building. The outer ends of these chutes are flush with the sides of the shed or building, and each is provided with a door, C, hinged at their upper ends to the top part of the chutes, as shown at *a*, and provided with a bolt, D, at their lower ends, which, when the doors are down or in a closed position, fit into notches in the bottoms of the chutes, the bolts having springs, *b*, or their equivalents, bearing upon them, which have a tendency to keep the bolts in the notches, and the doors in a closed state. These bolts, with their fastenings, will require considerable strength, as the doors to which they are attached sustain the weight of the superincumbent coal or other substance, and protect the doors E therefrom. E represents doors, which are hinged to the bottoms of the chutes, as shown at *c*. These doors are provided with side strips, *d d*, to lap over the sides of the chutes when the doors are in an elevated or closed state, and to enable said doors E, when in an open state, to serve as continuations of the chutes B. The doors E are counterpoised by weights, F, attached to chains, G, the latter being connected to the upper ends of the doors, and passing over pulleys, *e*, in the framing of the shed or building. When the doors E are down or fully open, they rest upon a sleeper or plate, *f*, in the framing at the inner end; while the outer end is supported by the chains or ropes G, to which the weights F are so adjusted that when the door is lowered to the desired incline, they will strike against the timbers of the frame or others attached for that purpose, and form stops. When properly constructed and adjusted, they will, when open, have an inclined position corresponding to the inclination of the chutes B, as shown in fig. 1. The doors C have each a bar, H, attached by a pivot, *g*, and these bars are notched so as to catch over a pin, *h*, in the bottom of the chutes, a slot being made in the bottom for the bars H to work or pass through.

In operation the chute is first properly closed, then the desired quantity of coal is placed in each or either chute, being about three tons for an engine, and for transfers, a car load. When either of the chutes is to be used, the outer door E is lowered, which may be done by pulling a cord or chain, *i*, attached to it, said doors opening and closing easily, in consequence of being counterpoised by the weights F. This door, when in the proper position, forms a continuation of the chute to which it is attached, as shown in fig. 1. The bolt of the inner door C is then raised by pulling a cord or chain, *j*, attached to the bolt, when the pressure of the superincumbent coal immediately raises and opens the door C, which, when elevated, is held open by the bar H catching on the pin *h*, and the coal is at once discharged by the force of gravity into the tender or car placed to receive it. The coal is conveyed upon the platform A′ in any suitable manner, and thrown or discharged into the chutes B. I remark that the cords or chains *j*, attached to the bolts D, may be connected to levers (shown in red) for the purpose of raising the bolts; when used in this manner, the bar H may be dispensed with, as then the door, when opened, can be held open until all of the coal is discharged.

Having thus fully described my invention, what I claim as new, and desire to secure by Letters Patent, is—

The chutes B—placed in a shed or building—when provided with two doors, C E, the outer ones E being so arranged or combined as to serve, when lowered or opened, as a continuation of the chutes, substantially as shown and described.

I also claim counterpoising the outer doors E by means of weights, substantially in the manner as and for the purpose specified.

I further claim the doors C, when hung at their upper ends, in combination with the bolts D at their lower ends, when said doors are applied to chutes B, for the purpose herein set forth.

I further claim the chains or ropes G and weights F, for adjusting and supporting the outer end of the extension door E of a chute, substantially as specified.

EDWIN R. KERR.

Witnesses:

E. A. West,

R. G. Montony.